(12) United States Patent
Paterson et al.

(10) Patent No.: US 7,814,231 B2
(45) Date of Patent: Oct. 12, 2010

(54) METHOD OF SYNCHRONIZING BETWEEN THREE OR MORE DEVICES

(75) Inventors: Toby Paterson, Paris (FR); Jérôme Lebel, Paris (FR)

(73) Assignee: Apple Inc., Cupertino, CA (US)

( * ) Notice: Subject to any disclaimer, the term of this patent is extended or adjusted under 35 U.S.C. 154(b) by 1060 days.

(21) Appl. No.: 10/853,306

(22) Filed: May 24, 2004

(65) Prior Publication Data

US 2006/0031587 A1 Feb. 9, 2006

(51) Int. Cl.
*G06F 15/16* (2006.01)
(52) U.S. Cl. .................. 709/248; 709/202; 709/211
(58) Field of Classification Search ............ 709/248, 709/202, 211
See application file for complete search history.

(56) References Cited

U.S. PATENT DOCUMENTS

| | | |
|---|---|---|
| 4,937,743 A | 6/1990 | Rassman et al. |
| 5,129,057 A | 7/1992 | Strope et al. |
| 5,247,438 A | 9/1993 | Subas et al. |
| 5,323,314 A | 6/1994 | Baber et al. |
| 5,423,023 A | 6/1995 | Batch et al. |
| 5,457,476 A | 10/1995 | Jenson |
| 5,500,938 A | 3/1996 | Cahill et al. |
| 5,528,745 A | 6/1996 | King et al. |
| 5,621,458 A | 4/1997 | Mann et al. |
| 5,621,876 A | 4/1997 | Odam et al. |
| 5,634,100 A | 5/1997 | Capps |
| 5,659,768 A | 8/1997 | Forbes et al. |
| 5,664,063 A | 9/1997 | Johnson et al. |
| 5,761,646 A | 6/1998 | Frid-Nielsen et al. |
| 5,805,163 A | 9/1998 | Bagnas |
| 5,838,889 A | 11/1998 | Booker |

(Continued)

FOREIGN PATENT DOCUMENTS

EP  0276427 A2  8/1988

(Continued)

OTHER PUBLICATIONS

Bisignano, Mario, et al., Expeerience: a Jxta middleware for mobile ad-hoc networks, Proceedings of the Third International Conference on Peer-to-Peer Computing (P2P'03) 2003 IEEE, 2 pages.

(Continued)

*Primary Examiner*—Larry Donaghue
*Assistant Examiner*—Nicholas Taylor
(74) *Attorney, Agent, or Firm*—Blakely, Sokoloff, Taylor & Zafman LLP (57) ABSTRACT

Hitherto synchronization of a number of devices has involved a large number of comparison steps between actual data or changes in data. Such comparison has potentially involved extensive redundant comparison steps. Another problem with existing synchronization methods is that such synchronization has been effected based upon the systems clocks defined by the devices. Those system clocks can be modified either intentionally or malevolently with disastrous consequences for subsequent synchronization of the devices. Accordingly, the present invention relates to a method of synchronization between three or more devices, the method involves: storing an indication of the device or devices involved in each synchronization event; storing data changes received during a current synchronization event together with the device submitting those changes; and applying the data changes subsequent to the stored synchronization event for the or each device.

30 Claims, 8 Drawing Sheets

Administration table

| Client | Generation |
|---|---|
| Phone | 2 |
| Palm device | 0 |
| Home PC | 0 |
| Work PC | 0 |

Truth table

| Datum | Modify Generation | Add Generation | Client |
|---|---|---|---|
| X | | 1 | Phone |
| Y | | 1 | Phone |
| Z | | 2 | Phone |
| | | | |

U.S. PATENT DOCUMENTS

| | | | |
|---|---|---|---|
| 5,842,009 | A | 11/1998 | Borovoy et al. |
| 5,855,006 | A | 12/1998 | Huemoeller et al. |
| 5,860,067 | A | 1/1999 | Onda et al. |
| 5,895,451 | A | 4/1999 | Yamade et al. |
| 5,899,979 | A | 5/1999 | Miller et al. |
| 5,960,406 | A | 9/1999 | Rasansky et al. |
| 6,039,355 | A | 3/2000 | Durand |
| 6,064,975 | A | 5/2000 | Moon et al. |
| 6,085,166 | A | 7/2000 | Beckhardt et al. |
| 6,101,480 | A | 8/2000 | Conmy et al. |
| 6,167,379 | A | 12/2000 | Dean et al. |
| 6,222,549 | B1 | 4/2001 | Hoddie |
| 6,243,325 | B1 | 6/2001 | Tomono |
| 6,278,456 | B1 | 8/2001 | Wang et al. |
| 6,369,840 | B1 | 4/2002 | Barnett et al. |
| 6,380,959 | B1 | 4/2002 | Wang et al. |
| 6,397,075 | B1 | 5/2002 | Sastrodjojo et al. |
| 6,421,685 | B1 | 7/2002 | Nishikawa |
| 6,430,576 | B1 | 8/2002 | Gates et al. |
| 6,456,614 | B1 | 9/2002 | Guan et al. |
| 6,466,236 | B1 | 10/2002 | Pivowar et al. |
| 6,604,079 | B1 | 8/2003 | Ruvolo et al. |
| 6,728,530 | B1 | 4/2004 | Heinonen et al. |
| 6,738,789 | B2 | 5/2004 | Multer et al. |
| 6,785,868 | B1 | 8/2004 | Raff |
| 6,868,426 | B1 | 3/2005 | Mankoff |
| 6,889,333 | B2 | 5/2005 | Lawrence et al. |
| 6,910,052 | B2 | 6/2005 | Gates et al. |
| 7,006,242 | B2 | 2/2006 | Smith, II et al. |
| 7,006,484 | B2 | 2/2006 | Hayama et al. |
| 7,007,041 | B2 | 2/2006 | Multer et al. |
| 7,024,428 | B1 * | 4/2006 | Huang et al. ............... 707/201 |
| 7,039,596 | B1 | 5/2006 | Lu |
| 7,047,011 | B1 | 5/2006 | Wikman |
| 7,143,117 | B2 * | 11/2006 | Wolfgang et al. ........... 707/200 |
| 7,213,039 | B2 * | 5/2007 | Ramanujam et al. ........ 707/203 |
| 7,280,996 | B2 | 10/2007 | Hayakawa et al. |
| 7,584,468 | B2 | 9/2009 | Gates et al. |
| 2001/0002822 | A1 | 6/2001 | Watters et al. |
| 2001/0014890 | A1 | 8/2001 | Liu et al. |
| 2001/0044805 | A1 | 11/2001 | Multer et al. |
| 2001/0049617 | A1 | 12/2001 | Berenson et al. |
| 2002/0003787 | A1 | 1/2002 | Hayama et al. |
| 2002/0010807 | A1 | 1/2002 | Multer et al. |
| 2002/0131565 | A1 | 9/2002 | Scheuring et al. |
| 2002/0184321 | A1 | 12/2002 | Fishman et al. |
| 2002/0191035 | A1 | 12/2002 | Selent |
| 2002/0196280 | A1 | 12/2002 | Bassett et al. |
| 2003/0045301 | A1 | 3/2003 | Wollrab |
| 2003/0050986 | A1 | 3/2003 | Matthews et al. |
| 2003/0065677 | A1 | 4/2003 | Culp et al. |
| 2003/0065742 | A1 | 4/2003 | Culp et al. |
| 2003/0130984 | A1 * | 7/2003 | Quinlan et al. ................ 707/1 |
| 2004/0023634 | A1 | 2/2004 | Jeong et al. |
| 2004/0039779 | A1 | 2/2004 | Amstrong et al. |
| 2004/0054763 | A1 | 3/2004 | Teh et al. |
| 2004/0073615 | A1 | 4/2004 | Darling |
| 2004/0125142 | A1 | 7/2004 | Mock et al. |
| 2004/0136404 | A1 * | 7/2004 | Mahonen et al. ............ 370/503 |
| 2005/0125737 | A1 | 6/2005 | Allen et al. |
| 2005/0210104 | A1 | 9/2005 | Torvinen |
| 2005/0222971 | A1 | 10/2005 | Cary |
| 2006/0173917 | A1 | 8/2006 | Kalmick et al. |
| 2008/0288578 | A1 * | 11/2008 | Silfverberg ................. 709/203 |
| 2009/0300221 | A1 | 12/2009 | Gates et al. |

FOREIGN PATENT DOCUMENTS

| | | | |
|---|---|---|---|
| WO | WO 00/62146 | A1 | 10/2000 |
| WO | WO 00/62201 | A1 | 10/2000 |
| WO | WO 01/49051 | A1 | 7/2001 |
| WO | WO 02/44958 | A1 | 6/2002 |
| WO | WO 02/089026 | A2 | 11/2002 |

OTHER PUBLICATIONS

Paluska, Justin Mazzola, et al., Footloose: A Case for Physical Eventual Consistency and Selective Conflict Resolution, Proceedings of the Fifth IEEE Workshop on Mobile Computing Systems & Applications (WMCSA 2003) 2003 IEEE, 10 pages.

Prasad, Sushil K., et al., Enforcing Interdependencies and Executing Transactions Atomically Over Autonomous Mobile Data Stores Using SyD Link Technology, Proceedings of the $23^{rd}$ International Conference on Distributed Computing Systems Workshops (ICDCSW'03) 2003 IEEE, 7 pages.

Prasad, Sushil K., et al., Implementation of a Calendar Application Based on SyD Coordination Links, Proceedings of the International Parallel and Distributed Processing Symposium (IPDPS'03) 2003 IEEE, 8 pages.

PCT Notification Of Transmittal Of The International Search Report And The Written Opinion Of The International Searching Authority, Or The Declaration, for PCT International Appln No. US2005/014619, mailed Sep. 2, 2005, (11 pages total).

B. Mahoney, G. Babics, A. Taler: "Guide to Internet Calendaring", Network Working Group, Request for Comments: 3283, Jun. 2002.

D. Beard, M. Palanlappan, A. Humm, D. Banks, A. Nair, Y.Shan: "A Visual Calendar for Scheduling Group Meetings", Department of Computer Science, University of North Carolina, Chapel Hill, Oct. 1990 (pp. 279-290).

De Herrera, Chris. "Microsoft ActiveSync 3.1," *Pocket PC FAQ* (2000), downloaded from the Internet at: http:www.pocketpcfaq.com/wce/activesyn3.1.htm (pp. 1-9).

F.Dawson and D. Stenerson: "Internet Calendaring and Scheduling Core Object Specification (iCalendar)", Network Working Group, Request for Comments: 2445, Nov. 1998.

PCT International Preliminary Examination Report for PCT International Appln. No. US03/28053, mailed Mar. 3, 2005 (6 pages).

PCT International Preliminary Examination Report for PCT International Appln. No. US03/28247, mailed Feb. 25, 2005 (6 pages).

PCT International Preliminary Examination Report for PCT International Appln. No. US2005/014619, mailed Dec. 7, 2006 (7 pages).

PCT International Search Report for PCT International Appln. No. US03/28247, mailed Feb. 13, 2004 (6 pages).

PCT International Search Report for PCT International Appln. No. US03/28053, mailed Jun. 18, 2004 (5 pages).

PCT Written Opinion for PCT International Appln. No. US03/28053, mailed Sep. 16, 2004 (5 pages).

PCT Written Opinion for PCT International Appln. No. US03/28247, mailed Aug. 16, 2004 (5 pages).

Supplementary European Search Report for EP Application No. 03794665.4, dated Aug. 30, 2006 (3 pages).

Timecruiser Computer Corporation, "Timecruiser User Guide", Version 1.5, Jul. 1998, downloaded on Aug. 3, 2005 at https://www.atd.net/timecruiser/doc, pp. 1-50.

VAitA, OsaSync Frequently Asked Questions, Feb. 4, 2004, http://web.archive.org/web/20040204195815/http:www.vaita.com/faq.asp.

WindowsITPro, Replying To And Forwarding Messages, Jun. 6, 2003 http://web.archive.org/web/20030625191716/http://www.windowsitlibrary.com/Content/191/11/2.html.

Lamport, Leslie "Time, Clocks, and the Ordering of Events in A Distributed System", Communications of the ACM, Jul. 1978, vol. 21, No. 7, pp. 558-565.

SyncML White Papers, "Building an Industry-Wide Mobile Data Synchronization Protocol", Version 1.0, date not later than Jun. 2000, pp. 14.

* cited by examiner

FIG. 1

Administration table

| Client | Generation |
|---|---|
| Phone | 0 |
| Palm device | 0 |
| Home PC | 0 |
| Work PC | 0 |

Truth table

| Datum | Modify Generation | Add Generation | Client |
|---|---|---|---|
|  |  |  |  |
|  |  |  |  |
|  |  |  |  |
|  |  |  |  |

FIG. 2

Administration table

| Client | Generation |
|---|---|
| Phone | 1 |
| Palm device | 0 |
| Home PC | 0 |
| Work PC | 0 |

Truth table

| Datum | Modify Generation | Add Generation | Client |
|---|---|---|---|
| X |  | 1 | Phone |
| Y |  | 1 | Phone |
|  |  |  |  |
|  |  |  |  |

FIG. 3

Administration table

| Client | Generation |
|---|---|
| Phone | 2 |
| Palm device | 0 |
| Home PC | 0 |
| Work PC | 0 |

Truth table

| Datum | Modify Generation | Add Generation | Client |
|---|---|---|---|
| X |  | 1 | Phone |
| Y |  | 1 | Phone |
| Z |  | 2 | Phone |
|  |  |  |  |

FIG. 4

Administration table

| Client | Generation |
|---|---|
| Phone | 3 |
| Palm device | 3 |
| Home PC | 3 |
| Work PC | 3 |

Truth table

| Datum | Modify Generation | Add Generation | Client |
|---|---|---|---|
| X |  | 1 | Phone |
| Y |  | 1 | Phone |
| Z |  | 2 | Phone |
|  |  |  |  |

FIG. 5

Administration table

| Client | Generation |
|---|---|
| Phone | 3 |
| Palm device | 3 |
| Home PC | 3 |
| Work PC | 3 |

Truth table

| Datum | Modify Generation | Add Generation | Client |
|---|---|---|---|
|  |  |  |  |
|  |  |  |  |
|  |  |  |  |
|  |  |  |  |

FIG. 6

Administration table

| Client | Generation |
|---|---|
| Phone | 4 |
| Palm device | 3 |
| Home PC | 3 |
| Work PC | 3 |

Truth table

| Datum | Modify Generation | Add Generation | Client |
|---|---|---|---|
| A |  | 4 | Phone |
|  |  |  |  |
|  |  |  |  |
|  |  |  |  |

FIG. 7

Administration table

| Client | Generation |
|---|---|
| Phone | 4 |
| Palm device | 5 |
| Home PC | 3 |
| Work PC | 3 |

Truth table

| Datum | Modify Generation | Add Generation | Client |
|---|---|---|---|
| A |  | 4 | Phone |
| B |  | 5 | Palm |
|  |  |  |  |
|  |  |  |  |

FIG. 8

Administration table

| Client | Generation |
|---|---|
| Phone | 6 |
| Palm device | 5 |
| Home PC | 3 |
| Work PC | 3 |

Truth table

| Datum | Modify Generation | Add Generation | Client |
|---|---|---|---|
| A |  | 4 | Phone |
| B |  | 5 | Palm |
| C |  | 6 | Phone |
|  |  |  |  |

FIG. 9

Administration table

| Client | Generation |
|---|---|
| Phone | 7 |
| Palm device | 7 |
| Home PC | 7 |
| Work PC | 3 |

Truth table

| Datum | Modify Generation | Add Generation | Client |
|---|---|---|---|
| A |  | 4 | Phone |
| B |  | 5 | Palm |
| C |  | 6 | Phone |
| D |  | 7 | Home PC |

FIG. 10

Administration table

| Client | Generation |
|---|---|
| Phone | 8 |
| Palm device | 8 |
| Home PC | 8 |
| Work PC | 8 |

Truth table

| Datum | Modify Generation | Add Generation | Client |
|---|---|---|---|
|  |  |  |  |
|  |  |  |  |
|  |  |  |  |
|  |  |  |  |

FIG. 11

Administration table

| Client | Generation |
|---|---|
| Phone | 9 |
| Palm device | 8 |
| Home PC | 8 |
| Work PC | 8 |

Truth table

| Datum | Modify Generation | Add Generation | Client |
|---|---|---|---|
| G' | 9 | | Phone |
| | | | |
| | | | |
| | | | |

FIG. 12

Administration table

| Client | Generation |
|---|---|
| Phone | 9 |
| Palm device | 8 |
| Home PC | 8 |
| Work PC | 10 |

Truth table

| Datum | Modify Generation | Add Generation | Client |
|---|---|---|---|
| G' | 9 | | Phone |
| G'' | 10 | | Work PC |
| | | | |
| | | | |

FIG. 13

Truth attribute table

| Record No. | Datum | Modify Generation | Add Generation | Client |
|---|---|---|---|---|
| 1 | S" | 11 | | Work PC |
| 1 | Q | 11 | | Work PC |
| 2 | T | 12 | | Home PC |

Truth relationship table

| Relationship | Source from | Target to | Modify Generation | Add Generation | Client |
|---|---|---|---|---|---|
| to parent | 1 | 2 | | | |
| to child | 2 | 1 | | | |
| to child | 2 | 3 | | | |

FIG. 14

METHOD OF SYNCHRONIZING BETWEEN THREE OR MORE DEVICES

The present invention relates to a method of synchronizing. In particular but not exclusively, the present invention relates to synchronizing data between devices such as computers, palm devices, personal digital assistants, music devices and mobile telephones. The data to be synchronized may comprise any data but commonly includes calendars, music files, photo files, emails, contact lists, bookmarks and any other such data. The present invention also encompasses synchronization of applications. The present invention envisages that such synchronization may occur between applications on the same device or on different devices.

Hereinafter references to data includes data used by different applications and so the term devices includes applications stored on and run by an electronic device. Moreover, synchronization between devices includes synchronizing data used by different applications on the same electronic device.

Hitherto, synchronization of a number of devices has involved a large number of comparison steps between actual data or changes in data. Such comparison has potentially involved extensive redundant comparison steps. Another problem with the existing synchronization methods is that such synchronization has been effected based on the systems clocks defined by the devices. Those systems clocks can be modified either intentionally or malevolently with disastrous consequences for subsequent synchronization of the devices.

Figure 1:
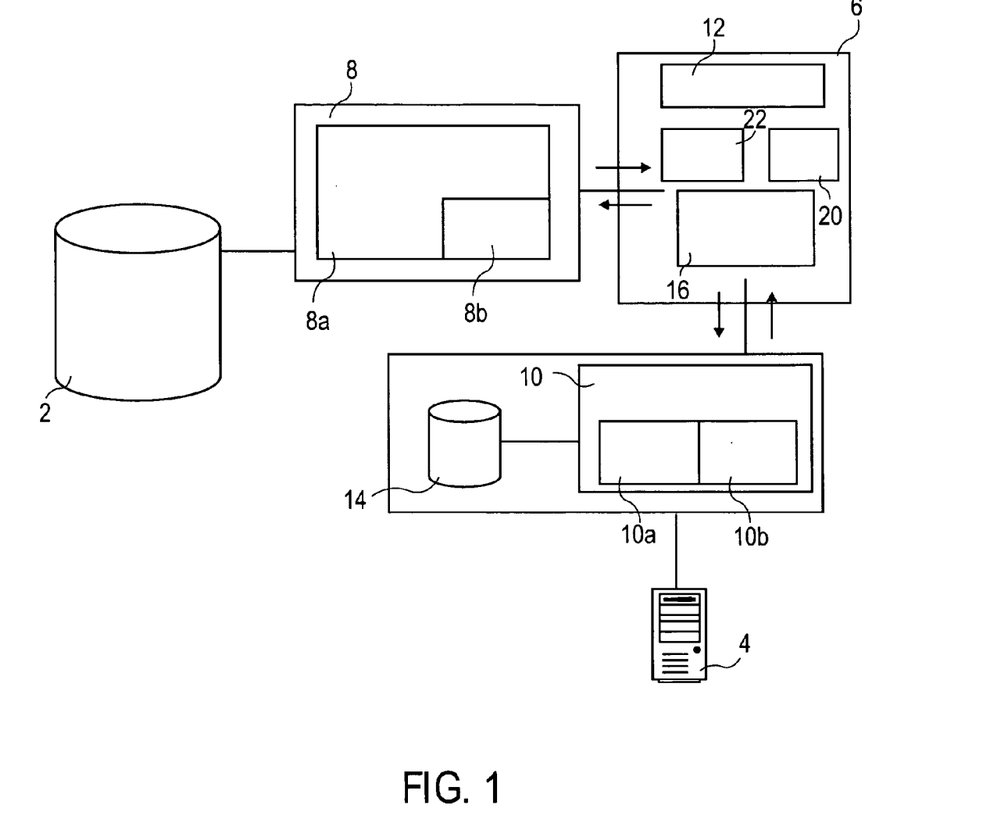
FIG. 1 is a schematic diagram of a synchronization system as disclosed in our co-pending application filed contemporaneously.

Synchronization between devices may be effected in a number of ways. Once such system is disclosed in one of our co-pending U.S. patent applications holding Ser. No. 10/453,051 filed on 2 Jun. 2003. However, to assist in the appreciation of a synchronization method, a brief description will now be given with reference to FIG. 1. In FIG. 1, there is shown a first device 2 to be synchronized with a second device 4. The devices 2 and 4 are due for synchronization through a synchronization engine 6. The devices communicate with the synchronization engine 6 through conduits 8 and 10. Each of the conduits have a device specific area 8a, 10a, and a structured delta area 8b and 10b. Typically, the conduits also include a conduit store 14, only one of which is shown in connection with conduit 10.

The synchronization engine 6 includes a synchronizer 12, mingler 16, Truth Table 20 and schema 22.

The conduits act as a liaison between the synchronization engine and the respective device. The conduits principally translate data between the devices data format and the synchronization engine's canonical format. That is to say, the conduit receives data to be synchronized from the respective device and puts it into a canonical format and submits the same to the synchronization engine 6. Conversely, the conduits receive canonical formatted data which is to be used to update the device and converts the same into the format of the respective device.

The device specific areas 8a, 10a, of each of conduits contain a static description of the devices' capabilities and indicates what types of records or fields can be synchronized and the list of fields for each record type which is supported by the respective device.

The structured deltas 8b, 10b retrieve the record or field which has been modified in the device and compares it with that stored in the conduit store 14. The structured delta effects the comparison and passes the change in the form known as a delta to the synchronized engine 6.

The mingler 16 receives the stream of deltas from each device in turn through the respective conduit and updates the Truth Table 20. The Truth Table is an amalgamated copy of the records from all of the devices involved in the synchronization system. Thus, during synchronization, each device is synchronized serially one at the time with the Truth Table and each record of the device being synchronized is synchronized with each record of the Truth Table. Hence, having obtained an amalgamation of all of the updated records from all of the devices, only then are the devices synchronized with the Truth Table, again serially.

Should any conflicts occur, then such conflicts are passed for conflict resolution through a user interface (not shown). The synchronization engine 6 also includes a synchronizer for effecting the functions of the mingler 16 and its affect on the Truth Table 20. In addition, the synchronizer 12 manages the communications to and from the conduits 8, 10. Finally, the schema 22 enables a user of the synchronization system to define the data to be synchronized, again through the user interface.

As discussed above, synchronization of data involves a large number of comparison steps. The excessively large number of comparison steps can be exacerbated when any device involved in the synchronization system is absent when the others are undergoing synchronization.

Hitherto, synchronization methods have been effected based upon the systems clocks defined by the devices. As noted earlier, those systems clocks can be modified either intentionally or malevolently. Thus, some devices, whose systems clocks have been changed, may be synchronized needlessly or, indeed, some data may not be included in the synchronization.

Thus, the present invention seeks to improve methods of synchronizing by optimally identifying only those comparison steps which need to be made. Accordingly, the present invention relates to a method of synchronizing between three or more devices, said method comprising:

storing an indication of the device or devices involved in each synchronization event;

storing data changes received during a current synchronization event together with the device submitting those changes; and applying the data changes subsequent to the stored synchronization event for the or each device.

Embodiments of the present invention will now be described by way of further example only and with reference to the accompanying drawings, in which.

Figure 2:
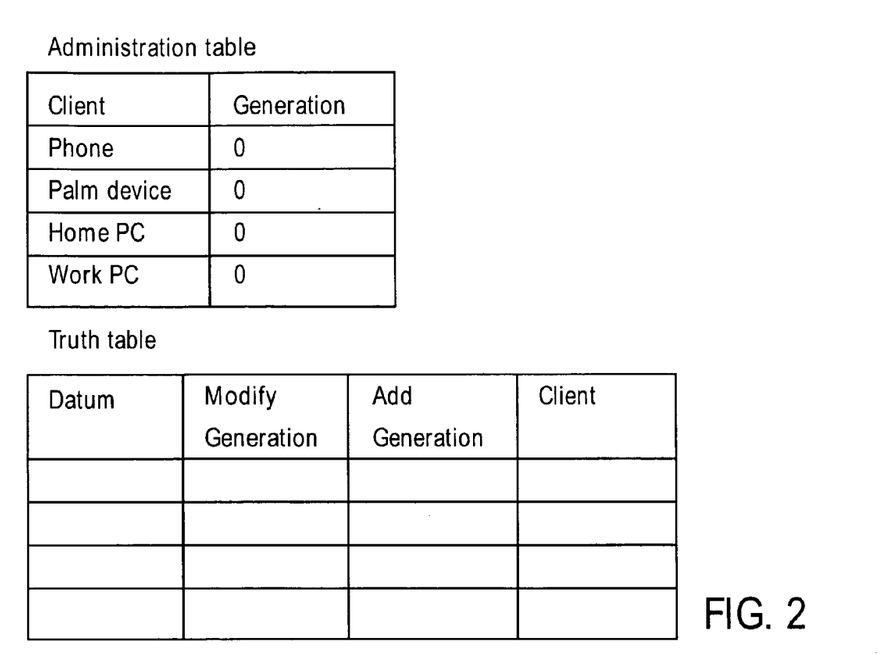
FIG. 2 is a schematic diagram of an Administration Table and Truth Table for effecting the method of synchronizing data according to the present invention.

The present invention relates to a method of synchronization which includes not only storing the actual data which has been changed but also together with logging the synchronization events and the devices involved in those events. Hence, as shown in FIG. 2, data is acquired in an Administration Table indicating which devices are involved in the synchronization system. In this case, the devices indicated are a phone, palm device, home computer and work computer. The synchronization events are indicated in the column generation. In this case, the synchronization system has been initialised such that there have been no synchronization events. Accordingly, for each device, the generation indicated is zero.

FIG. 2 also illustrates the Truth Table which provides a format for storing the data being changed under the column Datum. The synchronization events are stored in one or two columns, Modify Generation and Add Generation. Modify Generation events involve where the field or record has already existed and the change involves a modification of that data. Conversely, Add Generation notes those new fields or records to be added. Finally, the Truth Table also indicates which device or client has provided the change under the column Client. Since FIG. 2 refers to the initialised state of the synchronization system, there is no data in the Truth Table.

Figure 3:
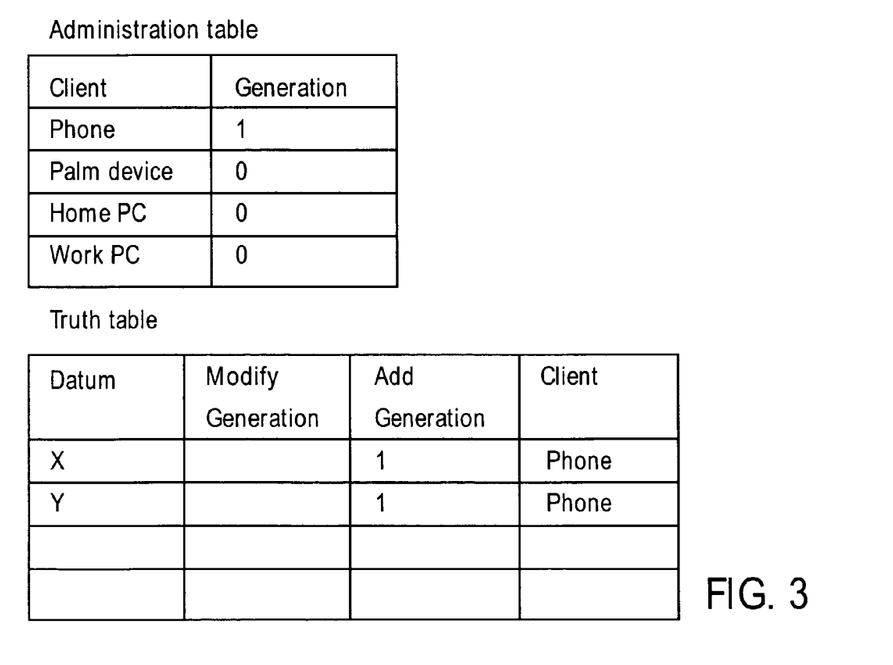
FIG. 3 is a schematic diagram of an Administration Table and Truth Table for effecting the method of synchronizing data according to the present invention.

FIG. 3 demonstrates the type of data which may be stored after the first synchronization event. In this case, the phone in the synchronization system is the only one involved in the synchronization event. The phone submits two new records or fields X and Y. Hence, in the Administration Table, the device or client phone is indicated as being involved in the first synchronization event. In the Truth Table the data X and Y is indicated as being added in synchronization event 1 by the device or client phone.

Figure 4:
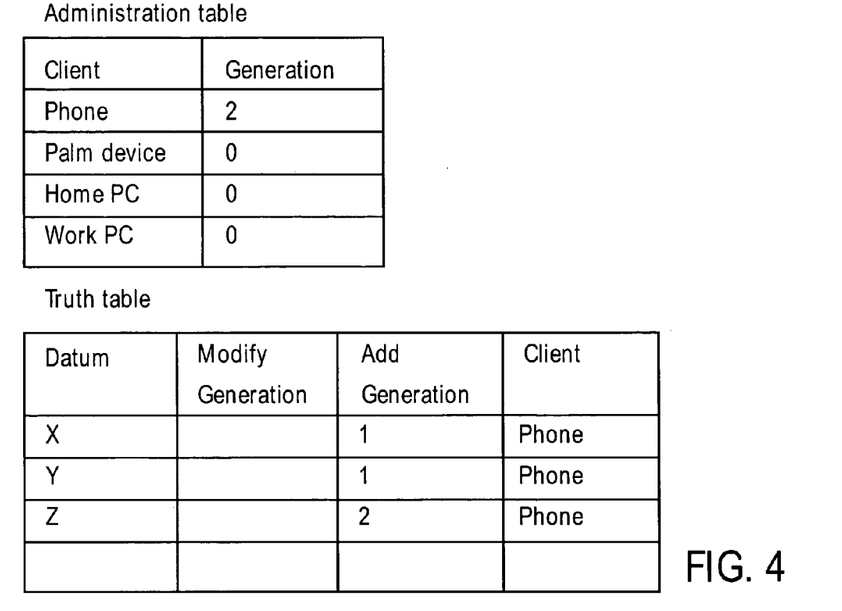
FIG. 4 is a schematic diagram of an Administration Table and Truth Table for effecting the method of synchronizing data according to the present invention.

In FIG. 4, the phone also instigates the second synchronization event by adding datum Z. Hence, the Administration Table is updated to indicate that the phone is involved in the second synchronization event, and that the Truth Table has added Datum Z in the second generation. In this case, it is necessary to retain both the previously added datums X and Y from the first synchronization event since the other devices or clients in the system, the palm device, home computer and work computer, have not been advised of the changes involved in the first synchronization event.

Figure 5:
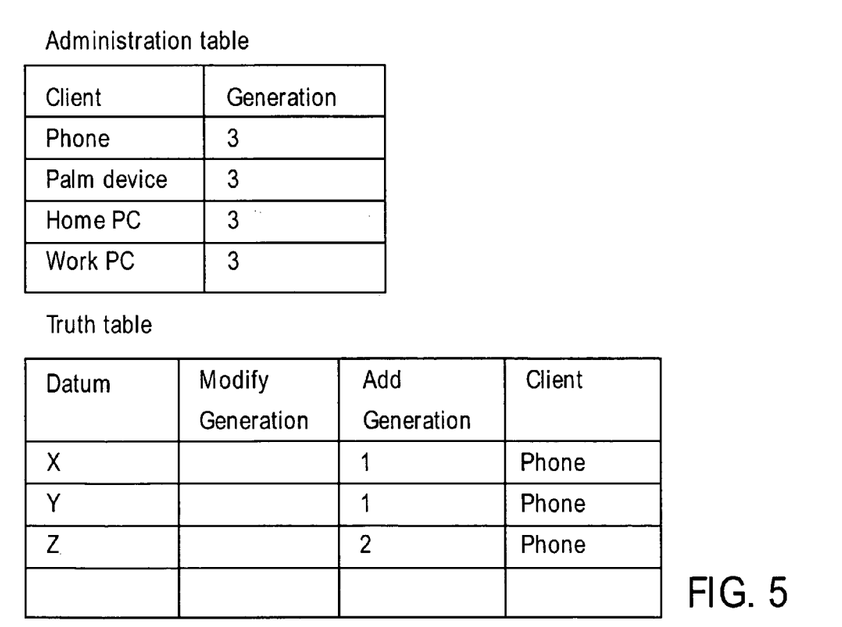
FIG. 5 is a schematic diagram of an Administration Table and Truth Table for effecting the method of synchronizing data according to the present invention.

In FIG. 5, all of the devices or clients are present during the third synchronization event. Hence, the Administration Table indicates all of the clients as being present in the third synchronization event. In the third synchronizing event, no data changes have occurred. Hence, no additional datum is indicated in the Truth Table. However, since the palm device, home computer and work computer were not present during the first and second synchronization events, these devices are updated from the Truth Table with the changes to the X, Y and Z datum. Since the phone submitted the datum changes X, Y and Z during the first and second synchronization events, there is no need to update the phone with the datum X, Y and Z.

Figure 6:
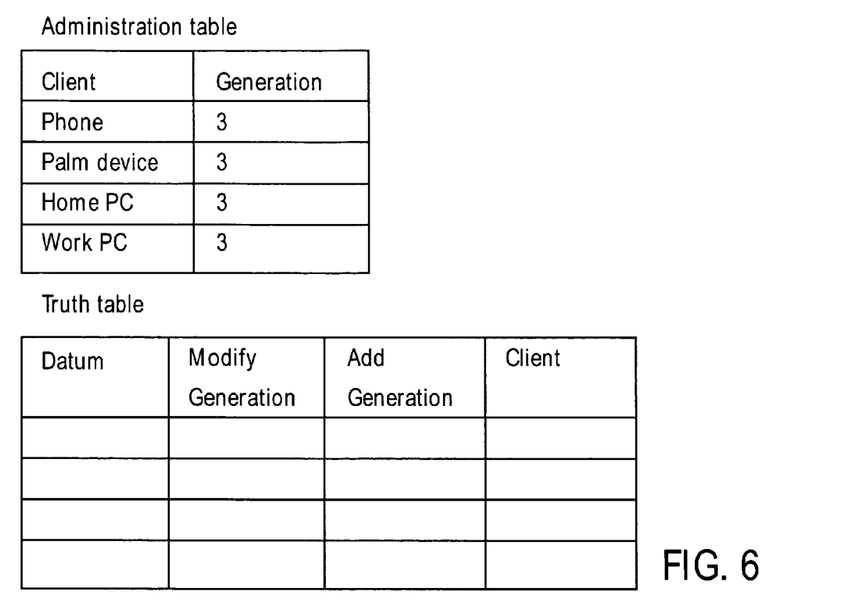
FIG. 6 is a schematic diagram of an Administration Table and Truth Table for effecting the method of synchronizing data according to the present invention.

Since all of the clients were present during the third synchronization event and that all of the clients were updated with all of the changes indicated in the Truth Table, then it is possible to delete those changes from the Truth Table. This is shown in FIG. 6. The Administration Table logs that each of the clients were each last involved in the third synchronization event but since all of the devices were updated with all of the changes up to the third synchronization event, those changes may be deleted from the Truth Table and the Truth Table is blank.

Figure 7:
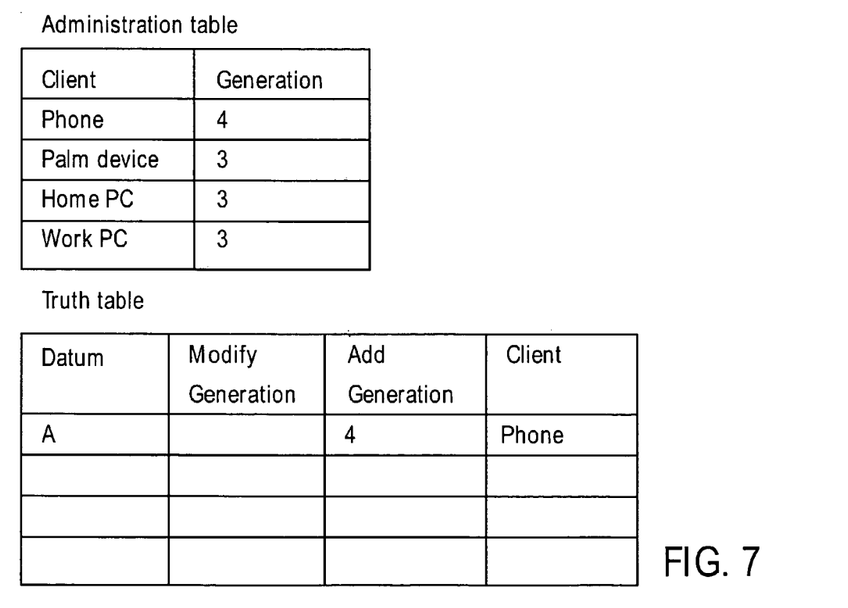
FIG. 7 is a schematic diagram of an Administration Table and Truth Table for effecting the method of synchronizing data according to the present invention.

FIG. 7 illustrates the fourth synchronization event, whereby the phone adds a new record A.

Figure 8:
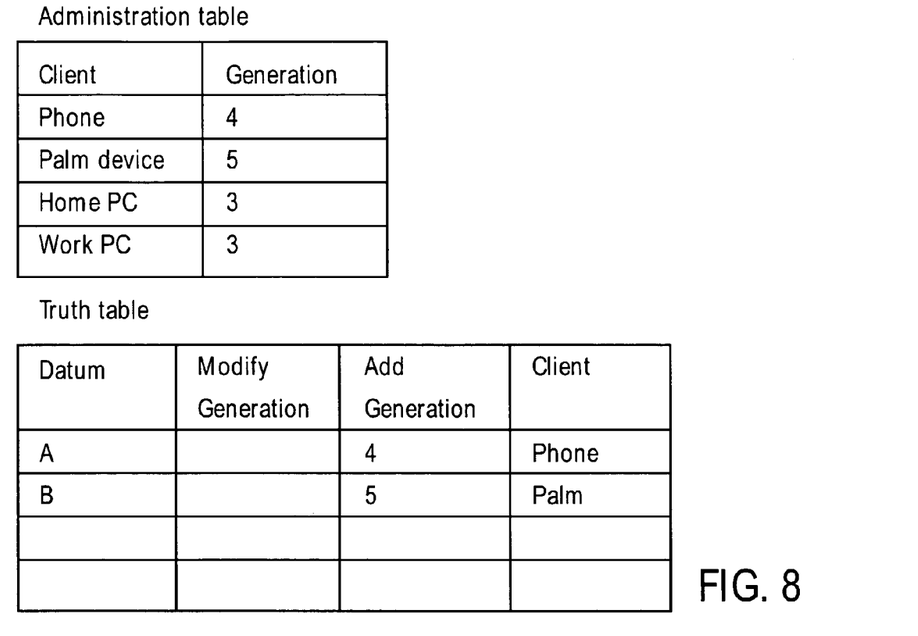
FIG. 8 is a schematic diagram of an Administration Table and Truth Table for effecting the method of synchronizing data according to the present invention.

FIG. 8 illustrates the palm device in the fifth synchronization event, adding a new record B. The palm device, since it was not involved in the fourth synchronization event, is updated with the new datum A which was submitted by the phone in the fourth synchronization event. However, the palm device is not updated with datum B since the palm device submitted the datum in the fifth synchronization event. Moreover, the phone is not updated with datum B since it was last present during the fourth synchronization event and is not present for the fifth synchronization event. Accordingly, the phone includes the new datum A but not the new datum B. The palm device includes both datum A and B. The home and work computers include neither datum A or B.

Figure 9:
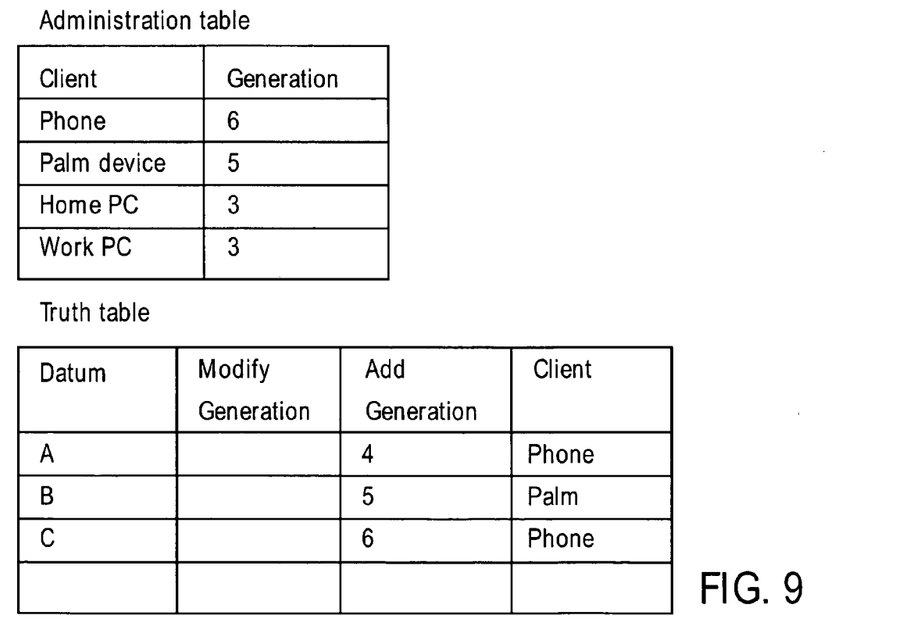
FIG. 9 is a schematic diagram of an Administration Table and Truth Table for effecting the method of synchronizing data according to the present invention.

In FIG. 9, the phone in the sixth synchronization event adds the new datum C. Moreover, the phone is updated with the new datum B submitted in the fifth synchronization event from the palm device.

Figure 10:
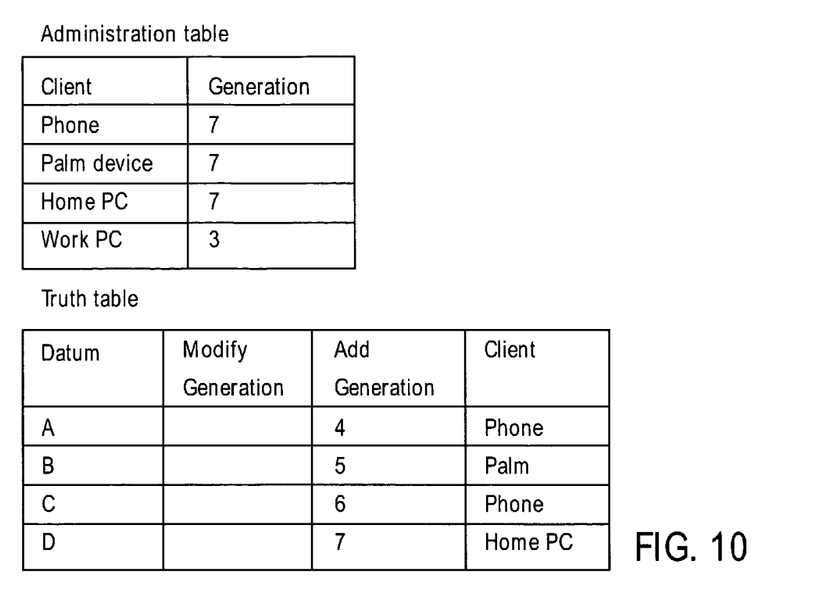
FIG. 10 is a schematic diagram of an Administration Table and Truth Table for effecting the method of synchronizing data according to the present invention.

In FIG. 10, the phone, palm device and home computer are all present during the seventh synchronization event which adds datum D on the home computer. Since the phone was present during the sixth synchronization event, the phone only needs to be updated with datum D. The palm device was previously present during the fifth synchronization event and so will be updated with datum C and D. The home computer, since it was only previously present during the third synchronization event, is updated with datum A, B and C. However, the home computer is not updated with datum D since the home computer submitted datum D itself. Finally, the work computer is not updated since it was not present during the seventh synchronization event and was previously only present during the third synchronization event. Accordingly, any changes since the third synchronization event must be retained in the Truth Table.

Figure 11:
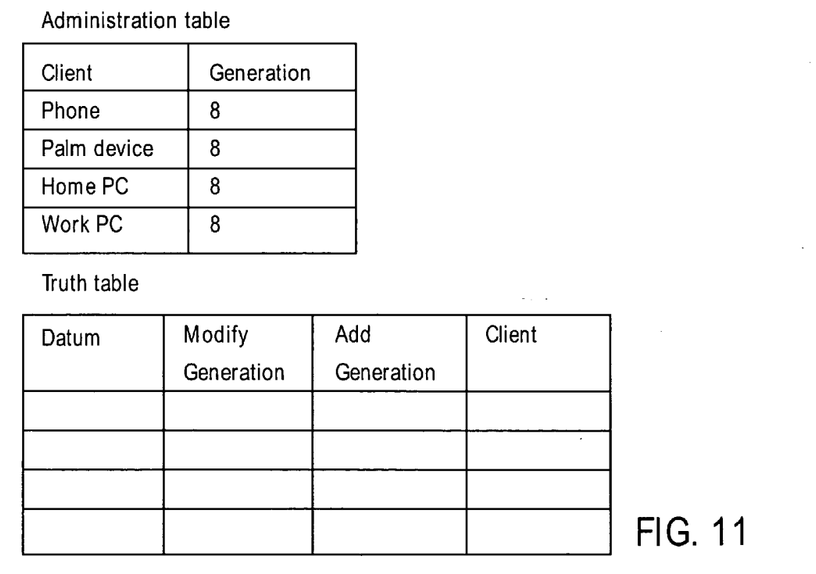
FIG. 11 is a schematic diagram of an Administration Table and Truth Table for effecting the method of synchronizing data according to the present invention.

In FIG. 11, all devices in the synchronization system are present during the eighth synchronization event. Accordingly, the work computer is updated with datum A, B, C and D. Since no further datum changes were submitted by any of the devices, the Truth Table can then be cleared of such changes. This is shown in FIG. 11.

Figure 12:
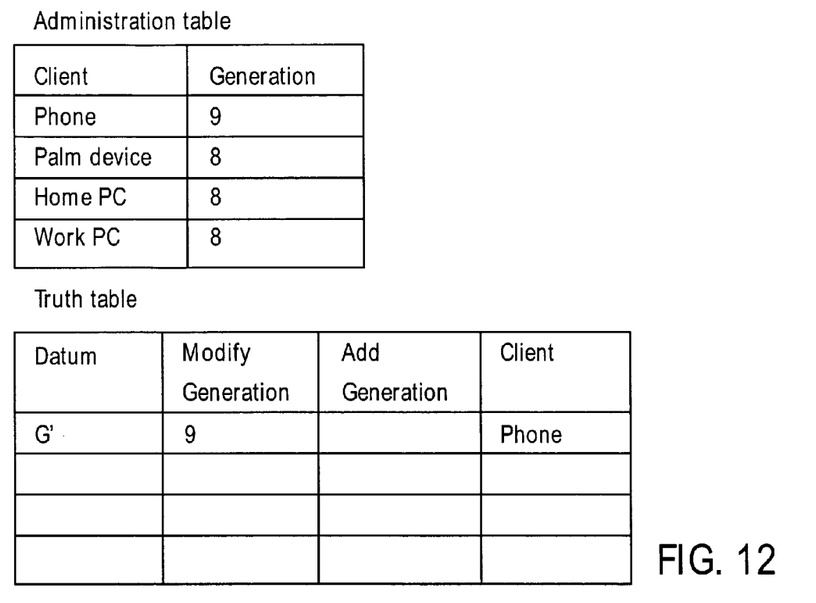
FIG. 12 is a schematic diagram of an Administration Table and Truth Table for effecting the method of synchronizing data according to the present invention.

In FIG. 12, during the ninth synchronization event, the phone submits a modification of datum G'.

Figure 13:
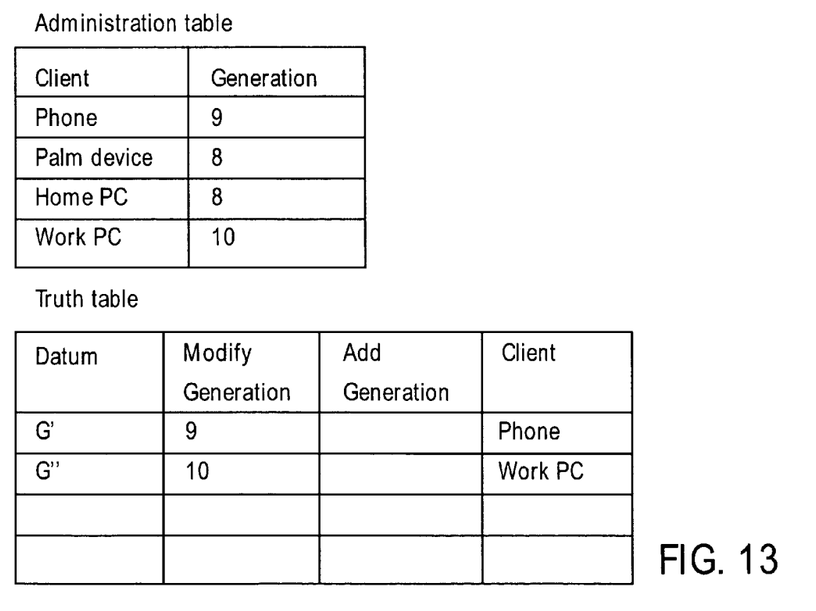
FIG. 13 is a schematic diagram of an Administration Table and Truth Table for effecting the method of synchronizing data according to the present invention.

In FIG. 13, the work computer submits a further modification to datum G". The datum G is thus modified by two different devices. Accordingly, the synchronization engine seeks in the first instance to identify whether any conflict exists. Various scenarios may be encountered during such identification:

The two devices may submit the same change. Thus, if G' equals G", then clearly there is no difference between the datum and hence no conflict exists.

If the datum comprises a field of a record as opposed to a record per se, then G' may relate to one field, whereas G" may relate another field of the same record. Hence, again there would appear to be no conflict.

If the datum comprises a whole record, then G' will not equal G" so that a conflict will be found to exist. However, the schema may include rules for defining whether such conflicts may be overlooked or whether they should be passed for conflict resolution. Such rules may include whether the datum involves an identity key such that all conflicts submitted to the user for resolution.

In any case, having identified whether a conflict exists and having resolved that conflict, the Truth Table is then updated with the resolved conflict. Subsequent synchronization events and updating steps are then effected, as discussed previously.

As a consequence of storing the actual data changes together with the log of synchronization events and the devices involved, it is possible to optimally identify only those comparison steps which need to be effected. Moreover, since the base line upon which the synchronization method relies is the log of synchronization events and clients involved, any modification of the systems clocks will not affect the optimal efficiency of the synchronization method.

The present invention is applicable to any known synchronization system, device or data. In particular, the synchronization method according to the present invention is particularly useful to not only attribute data but also relationship data. In the example where the data comprises contact lists, a persons contact details may include home telephone number, work telephone number and mobile telephone number as well as various addresses including e-mail addresses of both work and home, and postal address and work address. Each of the contact details would be considered a field, whereas all of the contact details for a particular person would be considered the record. Either the field or the record may be considered attribute data. The contact list may also include the relationships between that person and other persons held in the contact list. This could include the fact that the first person is a brother to a second person. A third person's details may also be given together with the relationship that he is a father to both the first and second person. Any types of relationships may be given, not just relative relationships but also relationship information such as girlfriend, boyfriend or partner, work colleague or other contact relationships.

Figure 14:
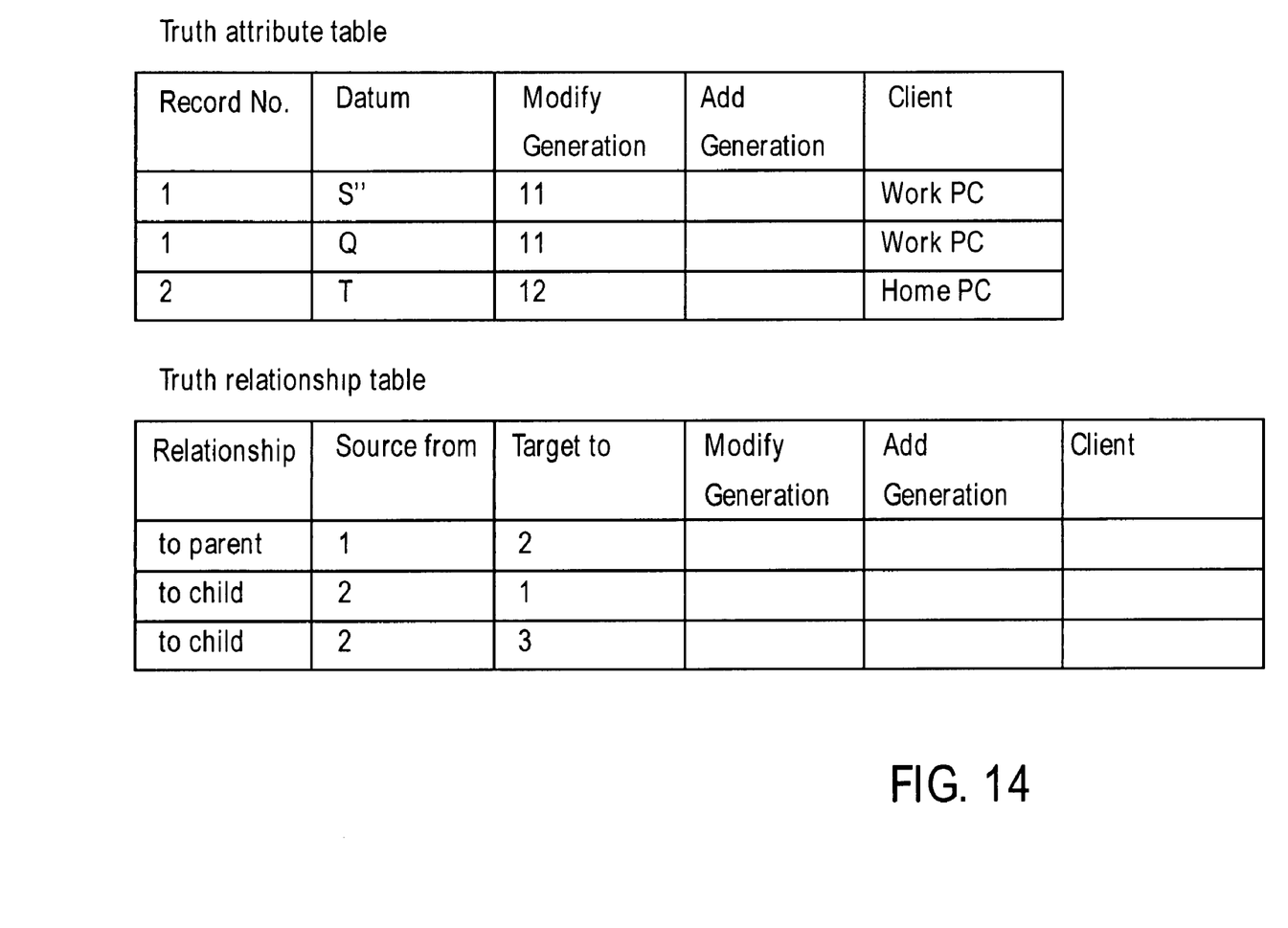
FIG. 14 is a schematic diagram of a Truth Attribute Table and Truth Relationship Table to illustrate in more detail the Truth Table included in the method of synchronizing data according to the present invention.

FIG. 14 indicates the type of Truth Table that may be held when synchronizing both attribute data and also relationship data. In this case, during synchronization event 11, the work computer submits modifications to record number 1 in relation to datum fields S" and Q. The home computer during the synchronization event 12 submits a modification to record number 2, including the datum field T.

The Relationship Table includes details of the relationship from source record number 1 to target record number 2, to indicate that the relationship is a parent relationship. Conversely, record number 2 is indicated as having a relationship as a child from record number 2 to both record number 1 and record number 3.

In FIG. 14, the Administration Table has not been included to concentrate on the Truth Table. Moreover, the Truth Attribute Table defines the datum as a field level and also includes a record number. This is not necessarily required according to the present invention but does assist in identifying all of the changes to a particular record. In all other respects, the Truth Tables indicated in FIG. 14 are merely a modification and extension of the Truth Tables indicated in the previous figures.

The foregoing description has been given by way of example only and it will be appreciated by a person skilled in the art that modifications can be made without departing from the scope of the present invention.

The invention claimed is:

1. A method, comprising:

storing, using one or more processors, a truth table and an administrative table, wherein the truth table receives and stores records associated with devices in a synchronization system, wherein the administrative table receives and stores synchronization events associated with devices in the synchronization system, and wherein the received synchronization events and associated device data are stored in a log;

receiving a first synchronization event associated with a first device in the synchronization system, wherein the truth table is updated to include records associated with the first synchronization event, and wherein the log in the administrative table is updated to include an indication that the first device was present during the first synchronization event;

receiving a second synchronization event associated with the first device and a second device in the synchronization system, wherein the truth table is updated to include records associated with the second synchronization event, and wherein the log in the administrative table is updated to include an indication that the first device and the second device were present during the second synchronization event;

using the log in the administrative table to determine that the second device was not present during the first synchronization event; and using the truth table to update the second device with the records associated with the first synchronization event.

2. The method of claim 1, wherein when the first device and the second device are the only devices in the synchronization system, all records in the truth table are deleted when the second device is updated with the records associated with the first synchronization event.

3. The method of claim 1, further comprising:

receiving a third synchronization event associated with one or more additional devices in the synchronization system, wherein no records are associated with the third synchronization event, and wherein the log in the administrative table is updated to include an indication that one or more additional devices were present during the third synchronization event;

using the log in the administrative table to determine that the one or more additional devices were not present during the first and second synchronization events; and using the truth table to update the one or more additional devices with the records associated with the first and second synchronization events.

4. The method of claim 3, wherein when the one or more additional devices are the only other devices in the synchronization system, all records in the truth table are deleted when the one or more additional devices have been updated with the records associated with the first and second synchronization events.

5. The method of claim 1, further comprising:
receiving a third synchronization event and a fourth synchronization event wherein the third synchronization event and the fourth synchronization event correspond to a particular record on two different devices;
identifying and resolving any conflicts caused by the receipt of the third synchronization event and the fourth synchronization event; and
subsequently updating the truth table to include remaining records associated with the third synchronization event and the fourth synchronization event.

6. The method of claim 1, wherein the truth table further includes a relationship table, and wherein the relationship table receives data corresponding to relationships between records associated with devices in the synchronization system.

7. The method of claim 1, wherein synchronization events are counted incrementally, and wherein each synchronization event corresponds to a change in a record.

8. The method of claim 1, wherein only devices that need to be updated are identified using the log in the administrative table, and updated using the truth table.

9. The method of claim 1, wherein storing synchronization events in the log in the administrative table is temporary.

10. The method of claim 1, wherein storing records in the truth table is temporary, and wherein all records associated with all synchronization events are deleted when all devices in the synchronization system have been updated.

11. A system, comprising:
one or more processors;
one or more computer-readable storage mediums containing instructions configured to cause the one or more processors to perform operations including:
storing a truth table and an administrative table, wherein the truth table receives and stores records associated with devices in a synchronization system, wherein the administrative table receives and stores synchronization events associated with devices in the synchronization system, and wherein the received synchronization events and associated device data are stored in a log;
receiving a first synchronization event associated with a first device in the synchronization system, wherein the truth table is updated to include records associated with the first synchronization event, and wherein the log in the administrative table is updated to include an indication that the first device was present during the first synchronization event;
receiving a second synchronization event associated with the first device and a second device in the synchronization system, wherein the truth table is updated to include records associated with the second synchronization event, and wherein the log in the administrative table is updated to include an indication that the first device and the second device were present during the second synchronization event;
using the log in the administrative table to determine that the second device was not present during the first synchronization event; and
using the truth table to update the second device with the records associated with the first synchronization event.

12. The system of claim 11, wherein when the first device and the second device are the only devices in the synchronization system, all records in the truth table are deleted when the second device is updated with the records associated with the first synchronization event.

13. The system of claim 11, further comprising:
receiving a third synchronization event associated with one or more additional devices in the synchronization system, wherein no records are associated with the third synchronization event, and wherein the log in the administrative table is updated to include an indication that one or more additional devices were present during the third synchronization event;
using the log in the administrative table to determine that the one or more additional devices were not present during the first and second synchronization events; and
using the truth table to update the one or more additional devices with the records associated with the first and second synchronization events.

14. The system of claim 13, wherein when the one or more additional devices are the only other devices in the synchronization system, all records in the truth table are deleted when the one or more additional devices have been updated with the records associated with the first and second synchronization events.

15. The system of claim 11, further comprising:
receiving a third synchronization event and a fourth synchronization event wherein the third synchronization event and the fourth synchronization event correspond to a particular record on two different devices;
identifying and resolving any conflicts caused by the receipt of the third synchronization event and the fourth synchronization event; and
subsequently updating the truth table to include remaining records associated with the third synchronization event and the fourth synchronization event.

16. The system of claim 11, wherein the truth table further includes a relationship table, and wherein the relationship table receives data corresponding to relationships between records associated with devices in the synchronization system.

17. The system of claim 11, wherein synchronization events are counted incrementally, and wherein each synchronization event corresponds to a change in a record.

18. The system of claim 11, wherein only devices that need to be updated are identified using the log in the administrative table, and updated using the truth table.

19. The system of claim 11, wherein storing synchronization events in the log in the administrative table is temporary.

20. The system of claim 11, wherein storing records in the truth table is temporary, and wherein all records associated with all synchronization events are deleted when all devices in the synchronization system have been updated.

21. A computer-program product, tangibly embodied in a machine-readable storage medium, including instructions operable to cause a data processing apparatus to:
store a truth table and an administrative table, wherein the truth table receives and stores records associated with devices in a synchronization system, wherein the administrative table receives and stores synchronization events associated with devices in the synchronization system, and wherein the received synchronization events and associated device data are stored in a log;
receive a first synchronization event associated with a first device in the synchronization system, wherein the truth table is updated to include records associated with the first synchronization event, and wherein the log in the administrative table is updated to include an indication that the first device was present during the first synchronization event;
receive a second synchronization event associated with the first device and a second device in the synchronization system, wherein the truth table is updated to include records associated with the second synchronization event, and wherein the log in the administrative table is updated to include an indication that the first device and the second device were present during the second synchronization event;

use the log in the administrative table to determine that the second device was not present during the first synchronization event; and use the truth table to update the second device with the records associated with the first synchronization event.

22. The computer-program product of claim 21, wherein when the first device and the second device are the only devices in the synchronization system, all records in the truth table are deleted when the second device is updated with the records associated with the first synchronization event.

23. The computer-program product of claim 21, further comprising:

receiving a third synchronization event associated with one or more additional devices in the synchronization system, wherein no records are associated with the third synchronization event, and wherein the log in the administrative table is updated to include an indication that one or more additional devices were present during the third synchronization event;

using the log in the administrative table to determine that the one or more additional devices were not present during the first and second synchronization events; and using the truth table to update the one or more additional devices with the records associated with the first and second synchronization events.

24. The computer-program product of claim 23, wherein when the one or more additional devices are the only other devices in the synchronization system, all records in the truth table are deleted when the one or more additional devices have been updated with the records associated with the first and second synchronization events.

25. The computer-program product of claim 21, further comprising:

receiving a third synchronization event and a fourth synchronization event wherein the third synchronization event and the fourth synchronization event correspond to a particular record on two different devices;

identifying and resolving any conflicts caused by the receipt of the third synchronization event and the fourth synchronization event; and subsequently updating the truth table to include remaining records associated with the third synchronization event and the fourth synchronization event.

26. The computer-program product of claim 21, wherein the truth table further includes a relationship table, and wherein the relationship table receives data corresponding to relationships between records associated with devices in the synchronization system.

27. The computer-program product of claim 21, wherein synchronization events are counted incrementally, and wherein each synchronization event corresponds to a change in a record.

28. The computer-program product of claim 21, wherein only devices that need to be updated are identified using the log in the administrative table, and updated using the truth table.

29. The computer-program product of claim 21, wherein storing synchronization events in the log in the administrative table is temporary.

30. The computer-program product of claim 21, wherein storing records in the truth table is temporary, and wherein all records associated with all synchronization events are deleted when all devices in the synchronization system have been updated.

* * * * *

UNITED STATES PATENT AND TRADEMARK OFFICE
CERTIFICATE OF CORRECTION

| | | |
|---|---|---|
| PATENT NO. | : 7,814,231 B2 | Page 1 of 1 |
| APPLICATION NO. | : 10/853306 | |
| DATED | : October 12, 2010 | |
| INVENTOR(S) | : Toby Paterson et al. | |

It is certified that error appears in the above-identified patent and that said Letters Patent is hereby corrected as shown below:

Title Page, Item (56)

On page 2, in column 2, under "Other Publications", line 25, delete "http:www.pocketpcfaq." and insert -- http://www.pocketpcfaq. --, therefor.

In column 1, line 31, delete "co-pending U.S." and insert -- U.S. --, therefor.

In column 1, line 32, delete "2003." and insert -- 2003, now Issued U.S. Patent No. 7,346,705. --, therefor.

Signed and Sealed this
Eighth Day of November, 2011

David J. Kappos
*Director of the United States Patent and Trademark Office*